US012809630B2

(12) United States Patent
Lissoos et al.

(10) Patent No.: US 12,809,630 B2
(45) Date of Patent: Nov. 24, 2026

(54) SELECTIVE TOGGLE SUPPRESSION IN MULTIPLEXED DATAPATHS

(71) Applicant: Apple Inc., Cupertino, CA (US)

(72) Inventors: Evan R. Lissoos, Austin, TX (US); Anurag Choudhury, Austin, TX (US); Casper R. van Benthem, Abbots Langley (GB)

(73) Assignee: Apple Inc., Cupertino, CA (US)

( * ) Notice: Subject to any disclaimer, the term of this patent is extended or adjusted under 35 U.S.C. 154(b) by 64 days.

(21) Appl. No.: 18/798,800

(22) Filed: Aug. 8, 2024

(65) Prior Publication Data

US 2025/0110740 A1 Apr. 3, 2025

Related U.S. Application Data

(60) Provisional application No. 63/586,155, filed on Sep. 28, 2023.

(51) Int. Cl.
*G06F 9/30* (2018.01)
*G06F 13/30* (2006.01)

(52) U.S. Cl.
CPC .......... *G06F 9/30145* (2013.01); *G06F 13/30* (2013.01)

(58) Field of Classification Search
CPC ........................................................ G06F 13/28
See application file for complete search history.

(56) References Cited

U.S. PATENT DOCUMENTS 6,112,017 A 8/2000 Wise
6,195,786 B1 * 2/2001 Raghunathan .......... G06F 30/30 716/133
7,653,891 B1 1/2010 Anderson et al.
8,169,849 B2 * 5/2012 Pyeon .................. G11C 7/1045 365/185.11
9,152,382 B2 10/2015 Hickmann et al.
(Continued)

FOREIGN PATENT DOCUMENTS

WO 2006058053 A2 6/2006

OTHER PUBLICATIONS

International Search Report and Written Opinion in PCT Appl. No. PCT/US2024/047077 mailed Dec. 27, 2024, 10 pages.

*Primary Examiner* — Henry Tsai
*Assistant Examiner* — Juanito C Borromeo
(74) *Attorney, Agent, or Firm* — Kowert, Hood, Munyon, Rankin & Goetzel, P.C.; Gentry C. McLean; Dean M. Munyon

(57) ABSTRACT

Techniques are disclosed involving selective toggle suppression in multiplexed datapaths. An embodiment of an apparatus includes a storage circuit and a control circuit. The storage circuit is configured to store a set of previous select values transmitted as a set of previous select signals to a multiplexer within a datapath of a computing device. The control circuit is configured to determine, based at least in part on the set of previous select signals and a set of input toggle likelihood signals, whether to maintain the set of previous select signals or provide a set of updated select signals to the multiplexer. In a further embodiment, the control circuit is further configured to determine whether a value of a particular input toggle likelihood signal corresponding to a previously selected data input of the multiplexer indicates a designation of the previously-selected data input as likely to receive a data value change.

20 Claims, 11 Drawing Sheets

(56) References Cited

U.S. PATENT DOCUMENTS

| | | | |
|---|---|---|---|
| 9,152,427 | B2 | 10/2015 | Vorbach et al. |
| 10,788,877 | B1 | 9/2020 | Ventrone et al. |
| 10,942,737 | B2 | 3/2021 | Ivanov |
| 2014/0331099 | A1 | 11/2014 | Wong et al. |
| 2019/0004878 | A1 | 1/2019 | Adler et al. |
| 2020/0409709 | A1 | 12/2020 | ChoFleming et al. |
| 2021/0232204 | A1 | 7/2021 | Maiyuran et al. |
| 2023/0019009 | A1 | 1/2023 | Rajeev Kumar et al. |
| 2023/0133269 | A1 | 5/2023 | David |

* cited by examiner

SELECTIVE TOGGLE SUPPRESSION IN MULTIPLEXED DATAPATHS

CROSS-REFERENCE TO RELATED APPLICATIONS

This application claims priority to U.S. Provisional App. No. 63/586,155 entitled "Selective Toggle Suppression in Multiplexed Datapaths," filed Sep. 28, 2023, the disclosure of which is hereby incorporated by reference herein in its entirety.

BACKGROUND

Technical Field

This disclosure relates generally to computer processors and more particularly to control circuitry for routing of data in processors.

Description of the Related Art

Data processing circuitry may include data networks in which data is passed through multiple cascaded stages. For example, many processors execute instructions using single instruction, multiple data (SIMD) or single instruction, multiple thread (SIMT) architectures, in which a given operation is specified for a set of multiple threads that perform the operation on potentially different data. Processing of a large array or image may involve use of a forwarding network selecting different operands in turn. Such networks often involve cascaded multiplexers, each multiplexer receiving multiple inputs and selecting one of the inputs to forward to the next stage.

DETAILED DESCRIPTION

Figure 1:
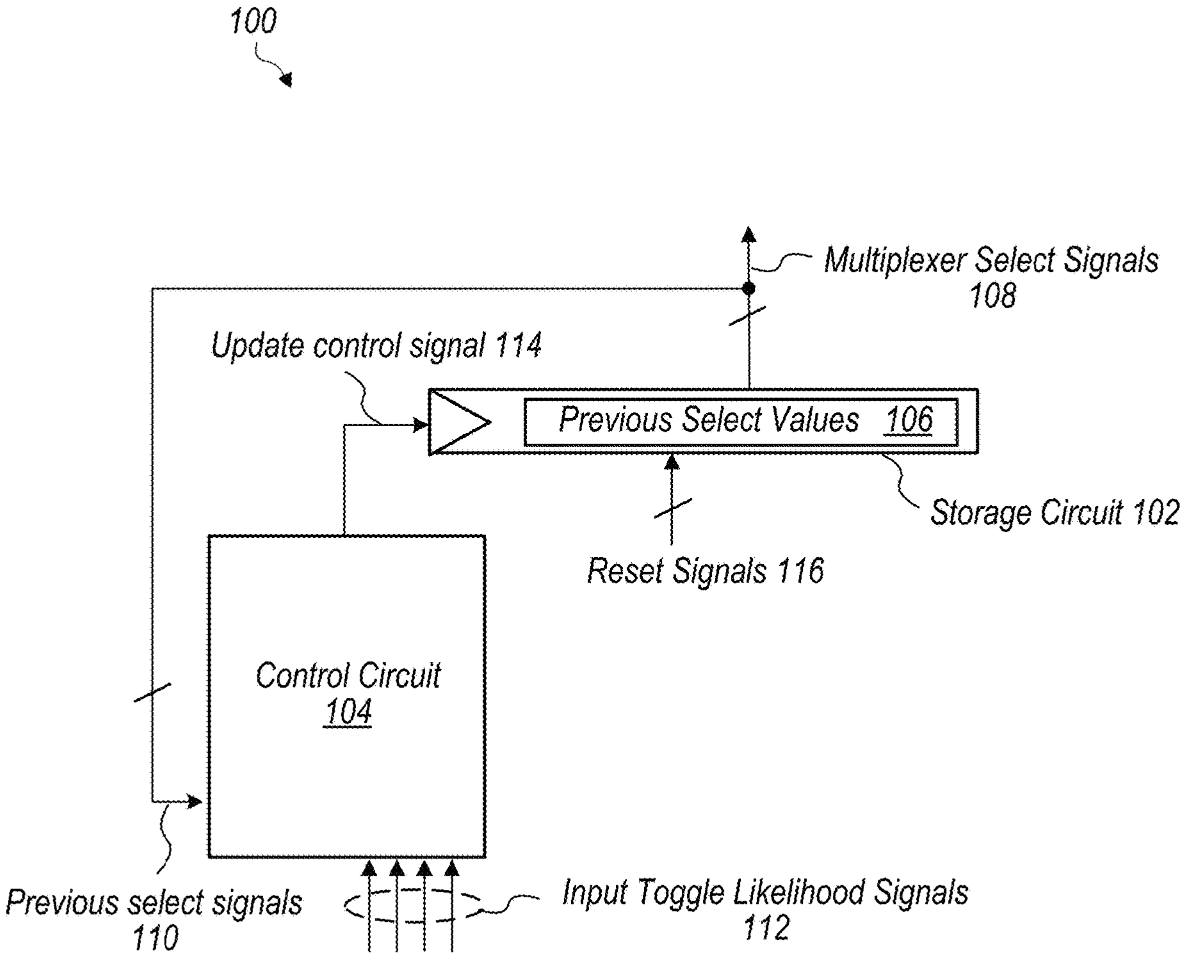
FIG. 1 is a block diagram illustrating example elements of a multiplexer control circuit configured to perform selective toggle suppression, according to some embodiments.

As mentioned above, many processors include datapaths with cascaded multiplexers. These networks can start with many inputs, with each input being a multibit signal. This multitude of input connections provides opportunities for data fluctuations, or "toggling" of lines that are not at that time connected through the datapath in a way allowing the data on the line to be actually used. Even if such an unused signal at an input doesn't make it through the entire datapath to the execution circuitry, propagation of an unused signal through even a part of the datapath causes gates within the datapath multiplexers to switch, wasting dynamic power.

One way of preventing extraneous data changes from propagating through a datapath is to "data gate" multiplexers along the path by, for example, setting the multiplexer control inputs to a reset value, which may include a value to select a known "quiet leg," when a given multiplexer is not being used to pass valid data. Changing the multiplexer control inputs in this way, as compared to the previous input settings, causes gates to switch in itself, however, consuming dynamic power. Suppression of extraneous input toggling can therefore waste dynamic power if done in situations where such toggling is not actually occurring. This excess dynamic power consumption can be significant in large forwarding networks carrying multibit values such as those used in SIMD processors.

The present disclosure describes techniques for implementing a "smarter" toggle suppression. Embodiments of a multiplexer control circuit as disclosed herein make a determination of whether to maintain a multiplexer's previous select signals or provide updated select signals. In an embodiment this determination includes determining whether a data value change at a data input of the multiplexer being controlled is likely to appear at the multiplexer's output. This may also be referred to as a determination of whether a data toggle will be "visible" at the output of the multiplexer. In a case for which valid data is not being sent through the multiplexer, if such an "output toggle" is likely, updated multiplexer select signals set to zero or some other "reset" value that will prevent propagation of the invalid toggle are provided. If no data toggle at the output is likely, the select signals are left alone unless valid data is being transmitted through the multiplexer. In this way, unnecessary dynamic power consumption is avoided. Embodiments of multiplexer control circuits as disclosed herein are illustrated in, for example, FIGS. 1, 4, 5A and 5B.

In an embodiment, multiplexer control circuits as disclosed herein are interconnected to form a control-side network that approximates the datapath-side network between the multiplexers being controlled. An example of such an interconnection is illustrated in, for example, FIG. 3. In such an implementation, data inputs for a multiplexer have corresponding input toggle likelihood signals as inputs to the control circuit for that multiplexer. An output toggle likelihood signal generated by the control circuit is fed to the control circuit for the next multiplexer in the datapath as one of that control circuit's input toggle likelihood signals. In an embodiment, this interconnection between control circuits mirrors the way the output of one multiplexer becomes one of the inputs to the next. It is not necessary to include a control circuit for every multiplexer in the datapath, however. In various embodiments, multiplexers that are rarely used or otherwise not considered worth modeling in the control-side network may be skipped. In an embodiment, multiplexers for which a control circuit is not used are wired so that their select signals will be set to the "reset" value when not passing valid data.

In an embodiment, the determination by a given multiplexer control circuit of whether the multiplexer output is likely to exhibit a data value change includes a determination of whether an input toggle likelihood signal corresponding to a previously-selected data input of the multiplexer indicates that the previously-selected data input is likely to receive a data value change. The "reset" value of select signals to prevent transmission through the multiplexer could include, for example, 0 values for all inputs of an AND-OR-invert (AOI) multiplexer using one-hot control. As another example, the reset value could be a value configured to select a particular input that is known to be "quiet," or stable to unintended data changes.

FIG. 1 illustrates certain elements of a multiplexer control circuit 100 configured to perform selective suppression of unintended data toggling. In particular, FIG. 1 shows elements of a multiplexer control circuit as described herein that are active during a cycle in which valid data is not being passed through a multiplexer. As shown, multiplexer control circuit 100 includes a storage circuit 102 coupled to a control circuit 104. Storage circuit 102 is configured to store previous select values 106. In various embodiments, storage circuit 102 may include a flipflop or other storage circuitry that can be controlled using update control signal 114. In some embodiments, storage circuit 102 includes combinational logic. During a given clock cycle, previous select values 106 are the values previously provided via multiplexer select signals 108 to a multiplexer (not shown) being controlled by circuit 100. The previous select signals are provided to control circuit 104, along with input toggle likelihood signals 112. In an embodiment, input toggle likelihood signals 112 come from output toggle likelihood signals generated by control circuits corresponding to multiplexers upstream, in the datapath, of the multiplexer being controlled, in a manner illustrated by the interconnected control circuits of FIG. 3.

In an embodiment, input toggle likelihood signals internal to a datapath are initially set based on the multiplexer selection sequence being implemented by instructions using the datapath. A particular sequence of multiplexer settings may be implemented to successively apply different operands to an execution circuit, for example, and a given input toggle likelihood signal for a multiplexer may reflect whether the corresponding input is carrying an operand being used during a given execution cycle. In an embodiment, an input toggle likelihood signal may reflect whether a new value is provided to an input or the input is otherwise updated. Input toggle likelihood signals may also be assigned values, such as for input toggle likelihood signals corresponding to inputs at the beginning of the multiplexed datapath or to inputs otherwise from outside of the datapath rather than from an output of an upstream multiplexer. In an embodiment, assigned values are based on known properties of particular data inputs in terms of likelihood to experience data value changes. In other embodiments, input toggle likelihood signals not supplied by an output toggle likelihood value of an upstream multiplexer control circuit may be set to a default value.

Control circuit 104 uses previous select signals 110 and input toggle likelihood signals 112 to generate an update control signal 114. In a cycle for which no valid data is being transmitted through the multiplexer being controlled, update control signal 114 determines whether to maintain the previous select signals as multiplexer select signals 108 or bring reset signals 116 into storage circuit 102 for transmission to the multiplexer as new multiplexer select signals 108. As the new select signals, the reset signals would become previous select signals 110 for the next cycle.

The elements shown in FIG. 1 represent the functionality of multiplexer control circuit 100 for the situation in which no valid data is being transmitted through the multiplexer. This is the situation in which dynamic power can be saved by maintaining the previous select signals if no unintended data toggle is likely at the output of the multiplexer. Multiplexer control circuit embodiments shown in, for example, FIGS. 4, 5A and 5B also illustrate functionality for the situation in which incoming select signals providing for valid data transmission are transmitted to the multiplexer.

Figure 2:
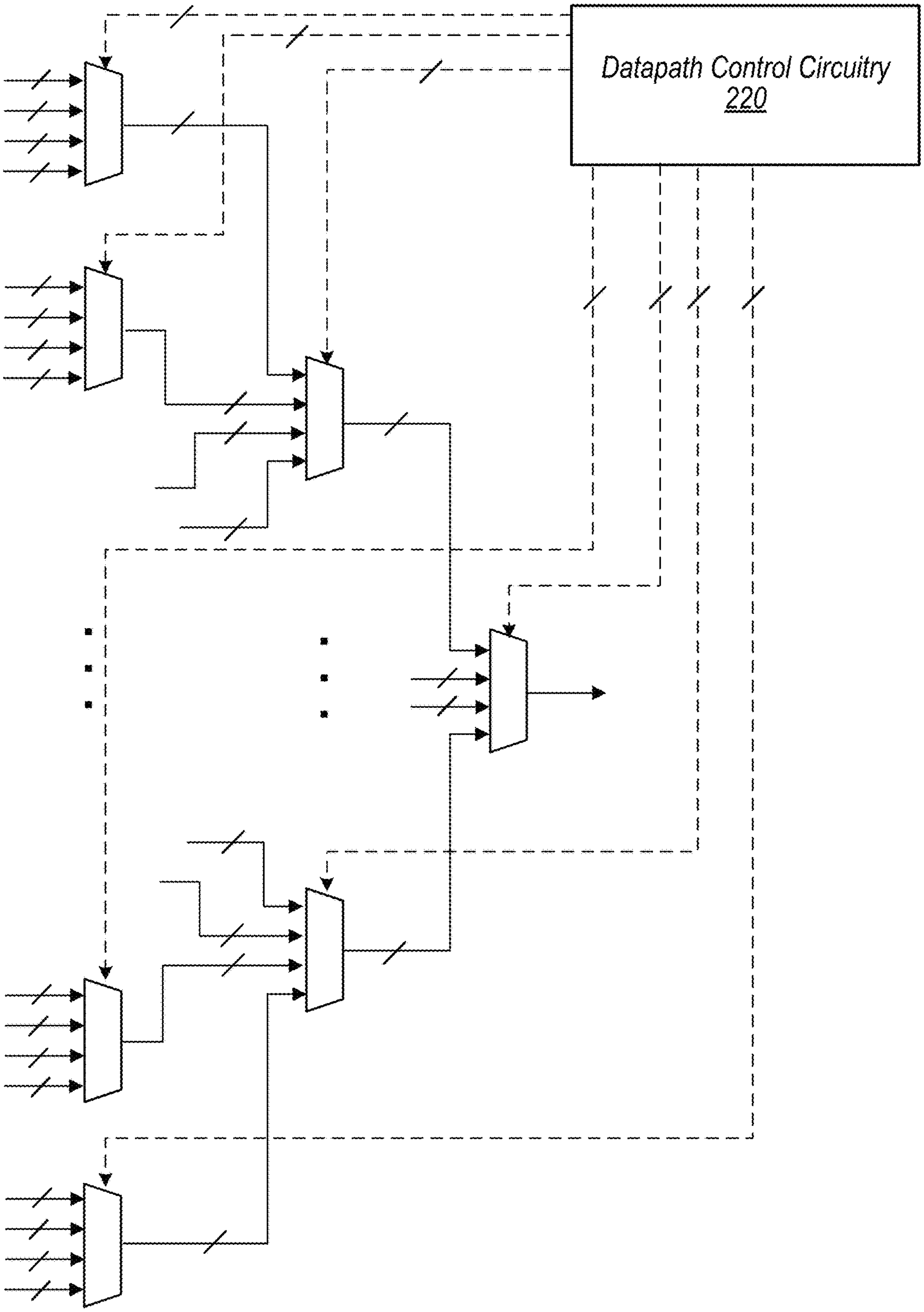
FIG. 2 is a block diagram illustrating example elements of a multiplexed datapath, according to some embodiments.

FIG. 2 illustrates example elements of a multiplexed datapath for which the multiplexer control circuits described herein may be used. As shown in FIG. 2, the datapath includes multiple cascaded multiplexers having multi-bit input and output signals. Each multiplexer receives select signals from overall datapath control circuitry configured to select among the various signals to implement data processing operations. In the embodiment of FIG. 2, data lines are shown with solid arrows while control signals such as select signals from datapath control circuitry 220 are shown using dashed-line arrows. In various embodiments, the multi-bit data lines may be 8, 16, 32 or even more bits wide. The select signals for a given multiplexer, by contrast, may include the number of lines as there are inputs to the multiplexer (or fewer, depending on how the selects are encoded). The control circuitry may therefore require a much smaller number of signal lines than the data line circuitry. FIG. 2 shows only a representative subset of an example multiplexed datapath. For example, actual datapaths may be longer and more complex, and may contain multiplexers with different numbers of inputs.

Figure 3:
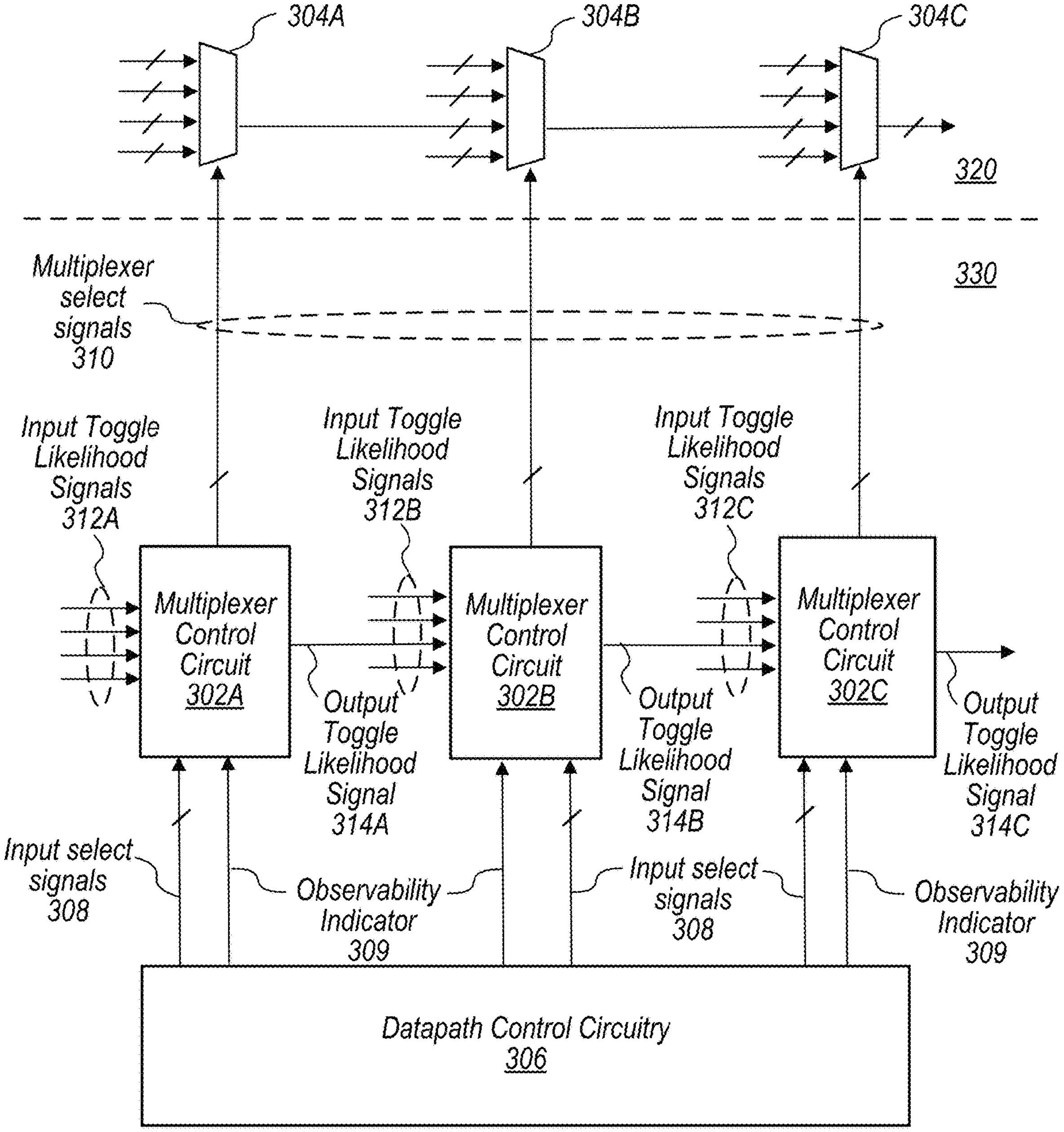
FIG. 3 is a block diagram illustrating example elements of a group of interconnected multiplexer control circuits configured to control respective interconnected multiplexers, according to some embodiments.

FIG. 3 illustrates a portion of a datapath including three cascaded multiplexers, where each of the multiplexers has a corresponding multiplexer control circuit interposed between the datapath control circuitry and the individual multiplexer's control input. The multiplexer control circuits of FIG. 3 can reduce dynamic power consumption by their corresponding multiplexers by implementing selective toggle suppression. In various embodiments, the use of single-bit input toggle likelihood signals in the control side circuitry can keep the power expended on the control side fairly low as compared to the potential dynamic power saved in the datapath multiplexers having multi-bit inputs.

In FIG. 3, a dashed line illustrates a conceptual boundary between datapath circuitry 320 and control circuitry 330. Datapath circuitry 320 includes cascaded datapath multiplexers 304A, 304B and 304C, with the output of multiplexer 304A feeding an input of multiplexer 304B and the output of multiplexer 304B feeding an input of multiplexer 304C. In an embodiment, multiplexers 304A-304C represent a small portion of a larger datapath, such as three of the cascaded multiplexers shown in FIG. 2. As shown in FIG. 3, each of multiplexers 304A-304C receives its own set of multiplexer select signals 310 from a corresponding multiplexer control circuit 302A, 302B or 302C. In general, the values of select signals 310 are different for each of multiplexers 304A-304C, depending on a multiplexer selection sequence being implemented by datapath control circuitry 306. Datapath control circuitry 306 is similar to datapath control circuitry 220 of FIG. 2 and is configured to provide control signals for operation of datapath circuitry 320 to implement data processing operations. In an embodiment, each of multiplexer control circuits 302A-304C includes elements of multiplexer control circuit 100 of FIG. 1 plus additional elements to also implement embodiments in which valid data is being passed by the corresponding datapath multiplexer.

Each of multiplexer control circuits 302A, 302B and 302C is configured to receive a corresponding set of toggle likelihood signals 312A, 312B or 312C, and to generate a corresponding output toggle likelihood signal 314A, 314B or 314C. In an embodiment, input toggle likelihood signals 312 are be set to reflect a multiplexer selection sequence being implemented by datapath control circuitry 306. For example, a particular input toggle likelihood signal may come from the output of a multiplexer control circuit controlling a multiplexer that is not being used to transmit data during a given cycle. Such an input toggle likelihood signal may be set to a value indicating the input is not likely to toggle (such as a "0" logical value, depending on the logic convention used). Input toggle likelihood signals coming from circuitry external to the datapath may in some embodiments be set based on known properties of circuits supplying the corresponding data signals. For some input toggle likelihood signals, a default value may be assigned. For example, an input may be assigned an input toggle likelihood indicating that the input is likely to toggle if there is not information available to indicate otherwise. In an embodiment, assignment of input likely toggle values is done "conservatively" in the sense that an input is considered likely to toggle if it is not certain that the input will not toggle. In such an embodiment, assigning an input as likely to toggle can be seen as designating the input as not guaranteed to be stable.

In addition to input toggle likelihood signals 312, each of multiplexer control circuits 302A, 302B and 302C is configured to receive a set of input select signals 308 and an observability indicator 309. In an embodiment, input select signals 308 are the multiplexer select signals provided by datapath control circuitry 306 for application to the corresponding datapath multiplexer 304A, 304B or 304C, in the absence of multiplexer control circuits 302A-302C. Observability indicator 309 is a signal indicating whether the output of the corresponding datapath multiplexer is "observed" further downstream in the datapath. This observability can be considered an indicator of whether the corresponding datapath multiplexer is passing valid data during a given cycle. In an embodiment, the observability indicator for the multiplexer corresponding to a given multiplexer control circuit is implemented using a select signal for the next downstream multiplexer. For example, if the select signals for the next downstream multiplexer are such that the output of the given multiplexer is not selected to be passed through the next downstream multiplexer, the given multiplexer is considered to be not observable. Other signals indicating whether a given multiplexer is being used to pass valid data may be used for the observability signal in other embodiments, depending on the particular design and configuration of datapath circuitry 320 and control circuitry 330. For example, observability indicator 309 may also be derived from input select signals 308 in some embodiments.

In an embodiment, each of multiplexer control circuits 302A-302C uses its corresponding input toggle likelihood signals 312, input select signals 308 and observability indicator 309 to generate its corresponding output toggle likelihood signal 314. Generation of output toggle likelihood signals 314 is described in more detail in connection with, for example, FIGS. 5A and 5B below. Each of multiplexer control circuits 302A-302C is also configured to provide a set of multiplexer select signals 310 to its corresponding multiplexer 304. Depending on input toggle likelihood signals 312, input select signals 308 and observability indicator 309, multiplexer select signals 310 may provide previous select values such as values 106 of FIG. 1, reset signals such as signals 116 of FIG. 1, or new input select signals such as input select signals 308. For example, multiplexer select signals 310 may be forced to zero or another reset value in a case where the multiplexer is not observable. Providing of multiplexer select signals 310 is described in more detail in connection with, for example, FIG. 4 below.

As illustrated by FIG. 3, the interconnected multiplexer control circuits of control circuitry 330 can form a control network that essentially mirrors the data network formed by the interconnected multiplexers of datapath circuitry 320. In various embodiments, such mirrored control and data networks are much larger and more complex, having multiple branches, than the example of FIG. 3. Interconnected multiplexer control circuits 302A-302C can be viewed as implementing a model of interconnected multiplexers 304A-304C allowing toggle suppression to be performed using less dynamic power. It is not necessary to model every multiplexer in a datapath to realize benefits of the techniques disclosed herein, however. In various embodiments, multiplexer control circuits 302 are omitted for multiplexers within a datapath for which the "smarter" toggle suppression described herein is not implemented. In such embodiments, reset signals may be provided, during any cycle for which valid data is not being transmitted, to the multiplexers not having a multiplexer control circuit 302. In some embodiments, such data gating is done for all multiplexers downstream of a multiplexer not having a corresponding multiplexer control circuit 302.

Figure 4:
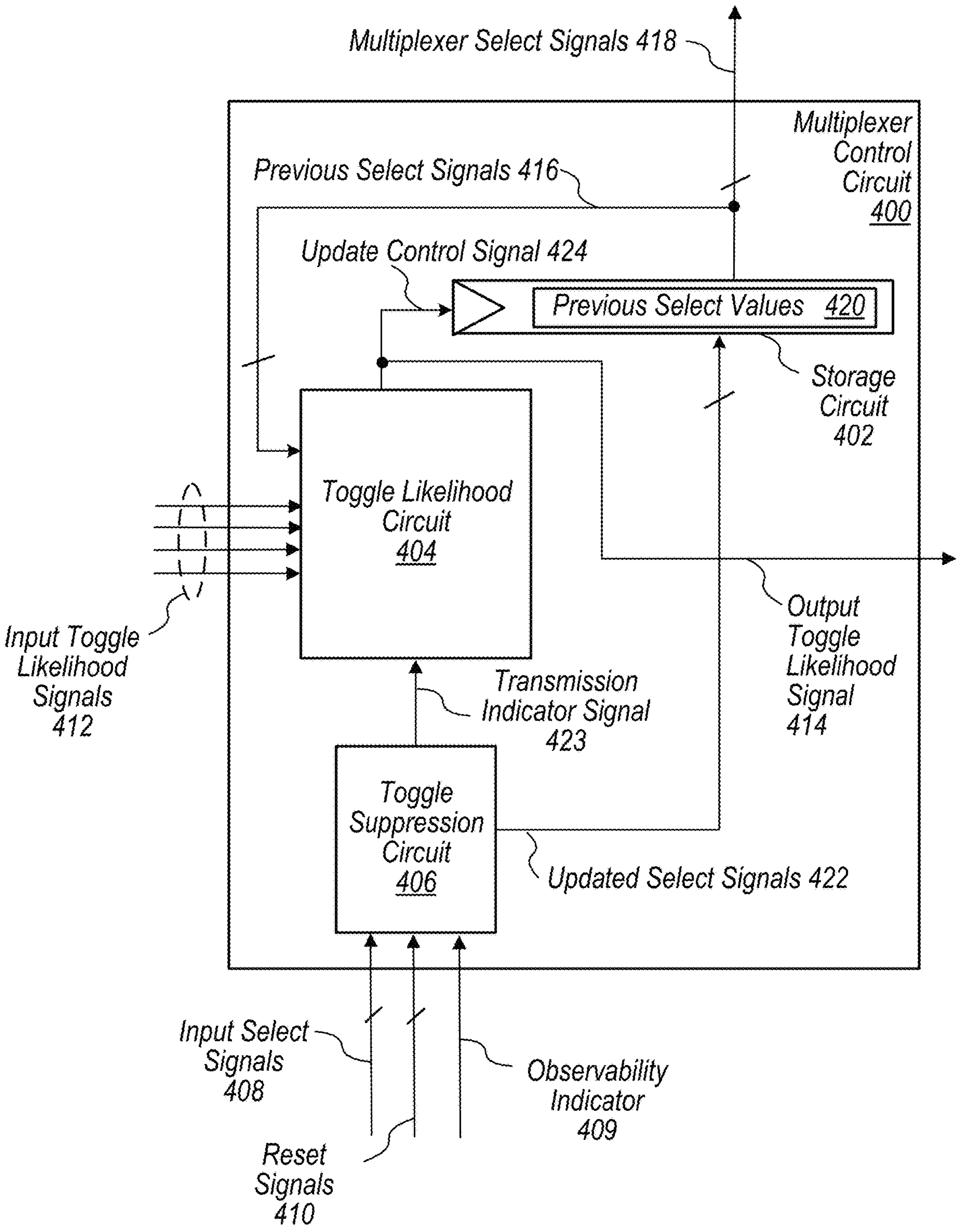
FIG. 4 is a block diagram illustrating example elements of a multiplexer control circuit configured to perform selective toggle suppression, according to some embodiments.

FIG. 4 illustrates example elements of a multiplexer control circuit 400. Multiplexer control circuit 400 is an example of one of multiplexer control circuits 302A-302C of FIG. 3. In addition to a storage circuit 402, circuit 400 includes a toggle likelihood circuit 404 and toggle suppression circuit 406.

Toggle suppression circuit 406 is configured to receive input select signals 408, reset signals 410 and observability indicator 409 and to generate updated select signals 422 and transmission indicator signal 423. Input select signals 408 and observability indicator 409 are similar to input select signals 308 and observability indicator 309 of FIG. 3. Reset signals 410 are similar to reset signals 116 of FIG. 1. In an embodiment, toggle suppression circuit 406 uses observability indicator 409 to determine whether input select signals 408 will pass valid data through the multiplexer being controlled by multiplexer control circuit 400. If toggle suppression circuit 406 determines that valid data will be passed through the multiplexer, input select signals 408 are forwarded to storage circuit 402 as updated select signals 422 and transmission indicator signal 423 is set to a value indicating that valid data will be passed. On the other hand, if toggle suppression circuit 406 determines that valid data will not be passed through the multiplexer using input select signals 408, reset signals 410 are forwarded to storage circuit 402 as updated select signals 422. In some embodiments, such as those using one-hot controls for an AOI multiplexer, reset signals 410 may set all select line values to zero. In other embodiments, reset signals 410 may otherwise be select signals that prevent toggling of data fluctuations, such as by selection of a known "quiet leg."

Toggle likelihood circuit 404 is configured to receive input toggle likelihood signals 412, previous select signals 416 and transmission indicator signal 423 and to produce update control signal 424 and output toggle likelihood signal 414. Input toggle likelihood signals 412 are similar to input toggle likelihood signals 312 of FIG. 3 and previous select signals 416 are similar to previous select signals 110 of FIG. 1. Toggle likelihood circuit 404 compares previous select signals 416 to input toggle likelihood signals 412. If the multiplexer input selected by previous select signals 416 is also an input designated as "likely to toggle" according to its corresponding input toggle likelihood signal 412, toggle likelihood circuit 404 sends update control signal to storage circuit 402 such that previous select values 420 are replaced with the values carried by updated select signals 422. Similarly, if toggle likelihood circuit 404 determines, based on transmission indicator signal 423, that valid data will be transmitted through the controller multiplexer using input select signals 408, values in storage circuit 402 are updated using update control signal 424. If neither of the above conditions are detected by toggle likelihood circuit 404—i.e., if neither the previously selected input is likely to toggle nor the multiplexer is going to transmit valid data—toggle likelihood circuit 404 maintains previous select values 420 in storage circuit 402. In the embodiment of FIG. 4, update control signal 424 is also forwarded to an additional multiplexer control circuit (for the next downstream multiplexer) as output toggle likelihood signal 414.

In an embodiment, storage circuit 402 is a flip-flop or other clocked storage device. Values corresponding to updated select signals 422 are stored in storage circuit 402 only if the circuit is updated, or clocked, using update control signal 424. Values stored in storage circuit 402 are provided to the controlled multiplexer as multiplexer select signals 418.

Figure 5A:
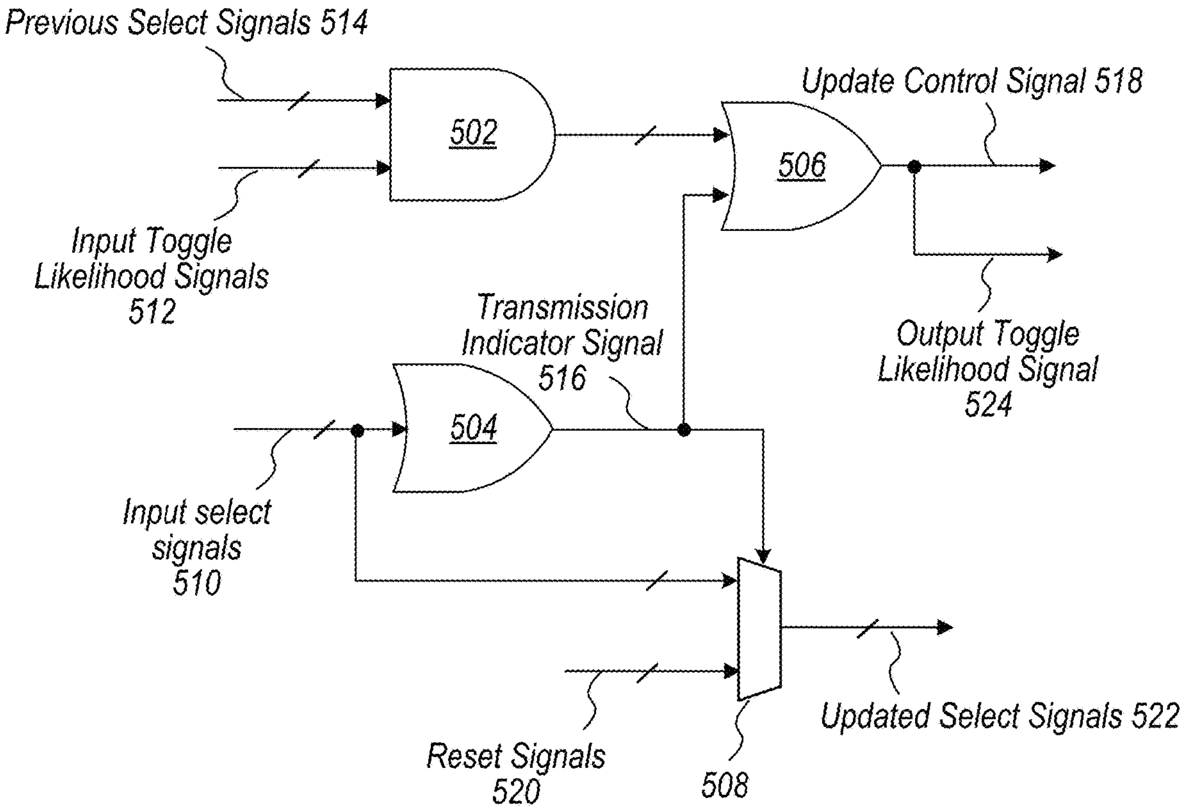
FIG. 5A is a block diagram illustrating example elements of a multiplexer control circuit configured to perform selective toggle suppression, according to some embodiments.
Figure 5B:
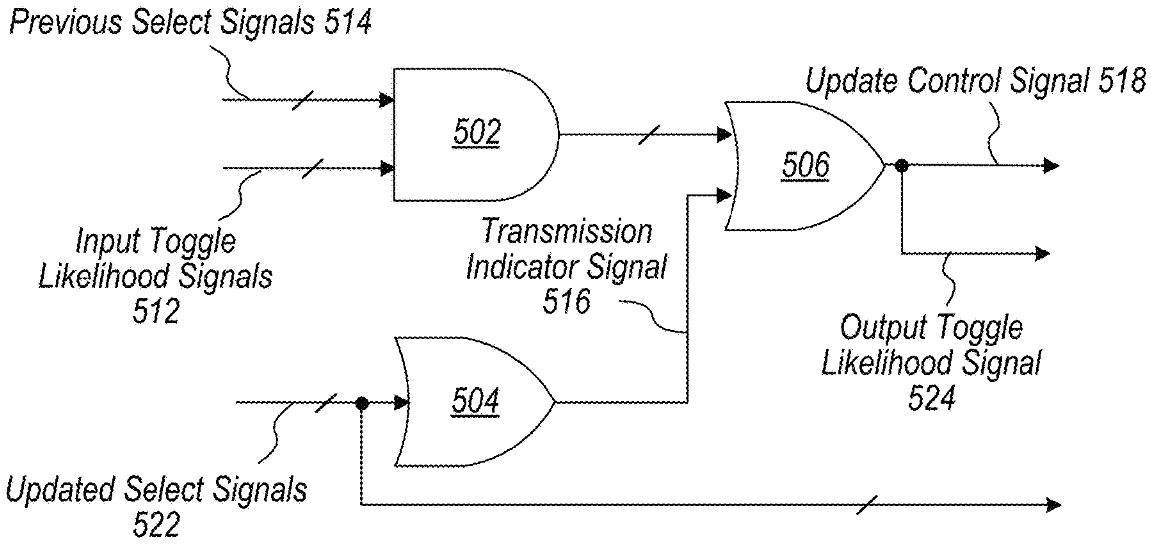
FIG. 5B is a block diagram illustrating example elements of a multiplexer control circuit configured to perform selective toggle suppression, according to some embodiments.

FIGS. 5A and 5B illustrate example elements of gate-level representations of portions of multiplexer control circuits as described herein. The circuits of FIGS. 5A and 5B use a one-hot multiplexer select convention for the datapath multiplexers, in which a single select signal corresponding to an input to be selected is made to have a high value. In embodiments for which multiplexer selects are encoded using a different scheme, the circuits of FIGS. 5A and 5B can be used by first converting the select signals to one-hot format. The functionality of the circuits of FIGS. 5A and 5B can also be implemented using alternative logic suitable for other multiplexer select encoding schemes, as would be understood by one of ordinary skill in the art of digital circuit design.

FIG. 5A illustrates an example circuit for producing toggle likelihood circuit 404 and toggle suppression circuit 406 of FIG. 4. The circuitry of FIG. 5A includes a bitwise AND gate 502, OR gate 506, OR gate 504 and control multiplexer 508. The functionality of the illustrated gates may be implemented by logic circuitry in various ways as understood by one of ordinary skill in the art of digital circuit design. In an embodiment, OR gate 504 and multiplexer 508 are connected to implement a toggle suppression circuit such as toggle suppression circuit 406 of FIG. 4. In the embodiment of FIG. 5A, an observability indicator similar to observability indicator 409 is not explicitly shown because this indicator has been incorporated into input select signals 510 by additional logic not shown. In particular, if an observability indicator shows that valid data is to be passed through the controlled multiplexer, input select signals 510 will include one active signal corresponding to the selected multiplexer input. On the other hand, if the observability indicator shows that valid data is not being passed through the controlled multiplexer, all signals in input select signals 510 are set to zero. Using this convention, the result of combining input select signals 510 using OR gate 504 is a logical "1" if valid data is to be transmitted and a logical "0" if valid data is not being transmitted. The output of gate 504 is therefore transmission indicator signal 516, which is similar to transmission indicator signal 423 of FIG. 4. In addition to being forwarded to OR gate 506 for generation of update control signal 518 and output toggle likelihood signal 524, transmission indicator signal 516 is used as a select signal for control multiplexer 508. If valid data is to be transmitted through the controlled datapath multiplexer, transmission indicator signal 516 causes input select signals 510 to be output as updated select signals 522. On the other hand, if valid data is not being transmitted through the controlled datapath multiplexer, transmission indicator signal 516 causes reset signals 520 to be output as updated select signals 522.

Continuing with the circuitry of FIG. 5A, gates 502 and 506 are connected to implement a toggle likelihood circuit such as toggle likelihood circuit 404 of FIG. 4. Bitwise AND gate 502 does a bitwise AND of previous select signals 514 and input toggle likelihood signals 512. Previous select signals 514 are similar to previous select signals 416 of FIG. 4 and input toggle likelihood signals 512 are similar to input toggle likelihood signals 412 of FIG. 4. The output of gate 502 will be a logical "1" only if the previously selected input is also an input for which the corresponding input toggle likelihood signal is high. If either the output of gate 502 is high, representing a likely toggle even in the absence of valid data being transmitted through the controlled multiplexer, or transmission indicator signal 516 is high, representing transmission of valid data through the controlled multiplexer, the output of OR gate 506 will be high. The output of gate 506 is used for both update control signal 518 and output toggle likelihood signal 524.

FIG. 5B is similar to FIG. 5A except that updated select signals 522 are received by OR gate 504 rather than input select signals 510. The embodiment of FIG. 5B illustrates an implementation in which toggle suppression is performed by datapath control circuitry such as datapath control circuitry 306 of FIG. 3 rather than by a multiplexer control circuit such as circuit 400 of FIG. 4. For example, in some implementations datapath control circuitry may implement toggle suppression to replace input select signals with reset signals for any multiplexer not being used to transmit valid data. In the embodiment of FIG. 5B updated select signals 522 are also formatted such that if the updated select signals are reset signals not being used to transmit valid data, the signal values are set to zero (if not set there already). This allows OR gate 504 to be used to generate transmission indicator signal 516 for use in generating update control signal 518 and output toggle likelihood signal 524.

It is noted that some time delay is associated with logic for implementing selective toggle suppression such as that shown in FIGS. 5A and 5B. The multiplexor control circuitry disclosed herein for implementing selective toggle suppression could in some embodiments cause data inputs to arrive before the multiplexer select signals are ready, which can cause additional toggling of multiplexer signals and usage of dynamic power. Ideally the multiplexor control signals are provided at the same time or just before the data inputs arrive. Because multiplexor select values may be known by the datapath control circuitry several cycles in advance as instructions go through the execution pipeline, multiplexer control circuits as disclosed herein may in some embodiments be configured to obtain input select signals a cycle early to determine multiplexer select signals for the next cycle. Delay elements may be included in the multiplexor control circuit logic in some such embodiments to adjust the timing between when the selectively toggle-suppressed multiplexer selects are ready and when the data arrives. In some embodiments, extraneous toggling and usage of dynamic power may be further minimized by matching the propagation delay of the multiplexer controls to the data arrival.

Figure 6:
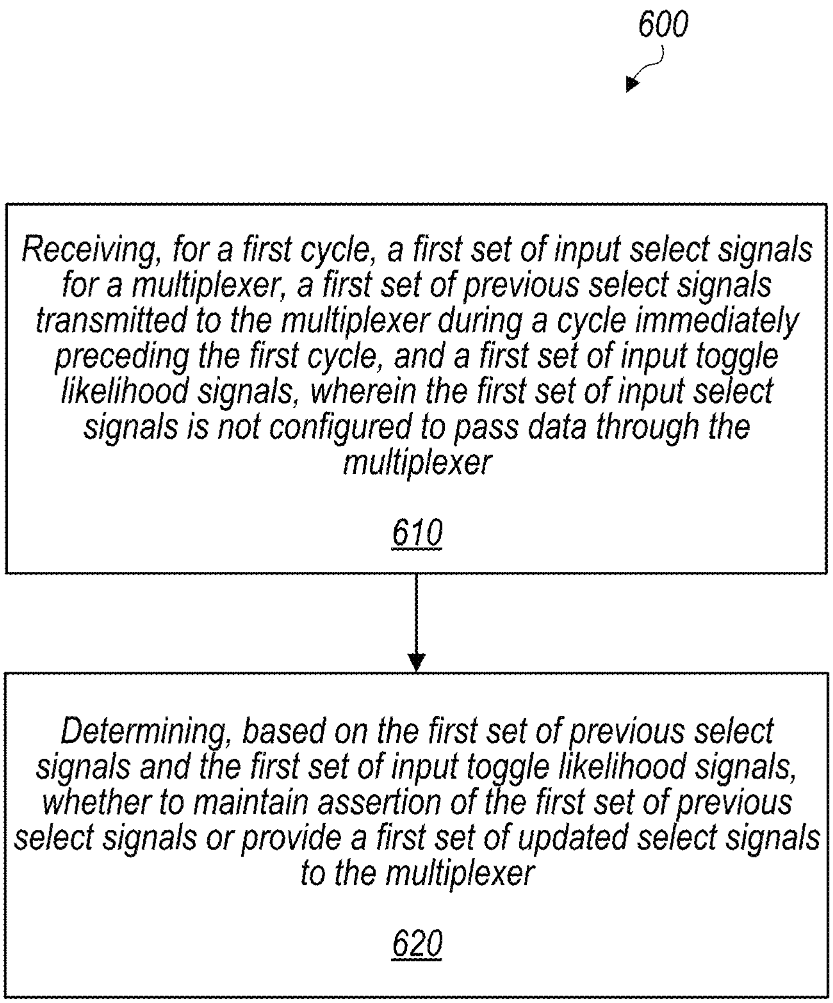
FIG. 6 is a flow diagram illustrating an example method relating to control of a multiplexer during a cycle when the multiplexer is not being used to transmit valid data, according to some embodiments.
Figure 7:
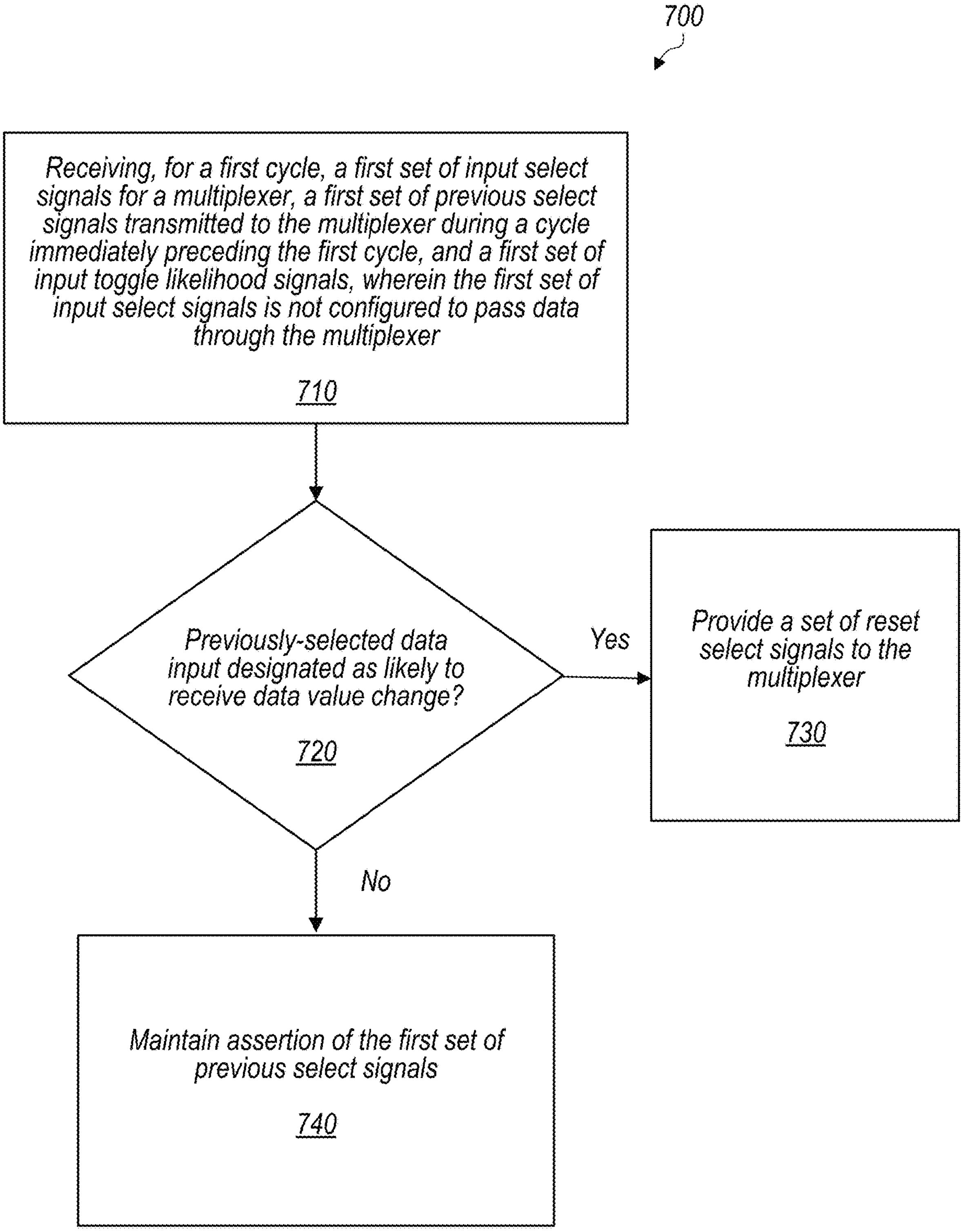
FIG. 7 is a flow diagram illustrating an example method relating to control of a multiplexer during a cycle when the multiplexer is not being used to transmit valid data, according to some embodiments.

FIGS. 6 and 7 illustrate examples of methods relating to control of a multiplexer during a cycle when the multiplexer is not being used to transmit valid data. Method 600 of FIG. 6 illustrates one embodiment of a method performed by a control circuit for a multiplexer, such as multiplexer control circuits 100 of FIG. 1, 302 of FIG. 3 and 400 of FIG. 4. Other embodiments of a method may include more or fewer blocks than shown in FIG. 6. Method 600 includes, at block 610, receiving, for a first cycle, a first set of input select signals for a multiplexer, a first set of previous select signals transmitted to the multiplexer during a cycle immediately preceding the first cycle, and a first set of input toggle likelihood signals. In the embodiment of FIG. 6, the first set of input select signals is not configured to pass data through the multiplexer. This situation in which valid data is not being passed through the multiplexer is a situation in which multiplexer selects might be conventionally set to a reset value, potentially resulting in unnecessary dynamic power usage.

Method 600 further includes, in block 620, determining, based on the first set of previous select signals and the first set of input toggle likelihood signals, whether to maintain assertion of the first set of previous select signals or provide a first set of updated select signals to the multiplexer. In an embodiment, the first set of input toggle likelihood signals includes a particular input toggle signal corresponding to a previously selected data input of the multiplexer, where the previously selected data input is an input selected by application of the first set of previous select signals to the multiplexer. In a further embodiment, determining whether to maintain assertion of the first set of previous select signals or provide a set of updated select signals includes determining whether a value of the particular input toggle likelihood signal indicates a designation of the previously-selected data input as likely to receive a data value change. If the value of the particular input toggle likelihood signal does not indicate a designation of the previously-selected data input as likely to receive a data value change, method 600 may further include maintaining assertion of the first set of previous select signals to the multiplexer. If the value of the particular input toggle likelihood signal indicates a designation of the previously-selected data input as likely to receive a data value change, method 600 may further include providing, by the control circuit and as the first set of updated select signals, a set of reset select signals configured to prevent transmission through the multiplexer of the data value change.

In a further embodiment of method 600, determining whether to maintain assertion of the first set of previous select signals or provide a first set of updated select signals includes generating, using the first set of previous select signals and the first set of input toggle likelihood signals, a first output toggle likelihood signal. Method 600 may further include forwarding such a first output toggle likelihood signal to an additional control circuit for an additional multiplexer, wherein the first output toggle likelihood signal forms one of an additional set of input toggle likelihood signals received by the additional control circuit. In another embodiment, method 600 may also include receiving, for a second cycle, a second set of input select signals for the multiplexer, wherein the second set of input select signals is configured to pass data through the multiplexer, and providing the second set of input select signals to the multiplexer.

Method 700 of FIG. 7 illustrates one embodiment of a method performed by a control circuit for a multiplexer, such as multiplexer control circuits 100 of FIG. 1, 302 of FIG. 3 and 400 of FIG. 4. Other embodiments of a method may include more or fewer blocks than shown in FIG. 7. In a manner similar to method 600 of FIG. 6, method 700 includes, at block 710, receiving, for a first cycle, a first set of input select signals for a multiplexer, a first set of previous select signals transmitted to the multiplexer during a cycle immediately preceding the first cycle, and a first set of input toggle likelihood signals. The first set of input select signals is not configured to pass data through the multiplexer. If a previously-selected data input is designated as likely to receive a data value change ("yes" branch of decision block 720), method 700 includes, at block 730, providing a set of reset select signals to the multiplexer. In an embodiment, the reset select signals are configured to prevent transmission through the multiplexer of the data value change. If the previously-selected data input is not designated as likely to receive a data value change ("no" branch of decision block 720), method 700 includes, at block 740, maintaining assertion of the first set of previous select signals.

Figure 8:
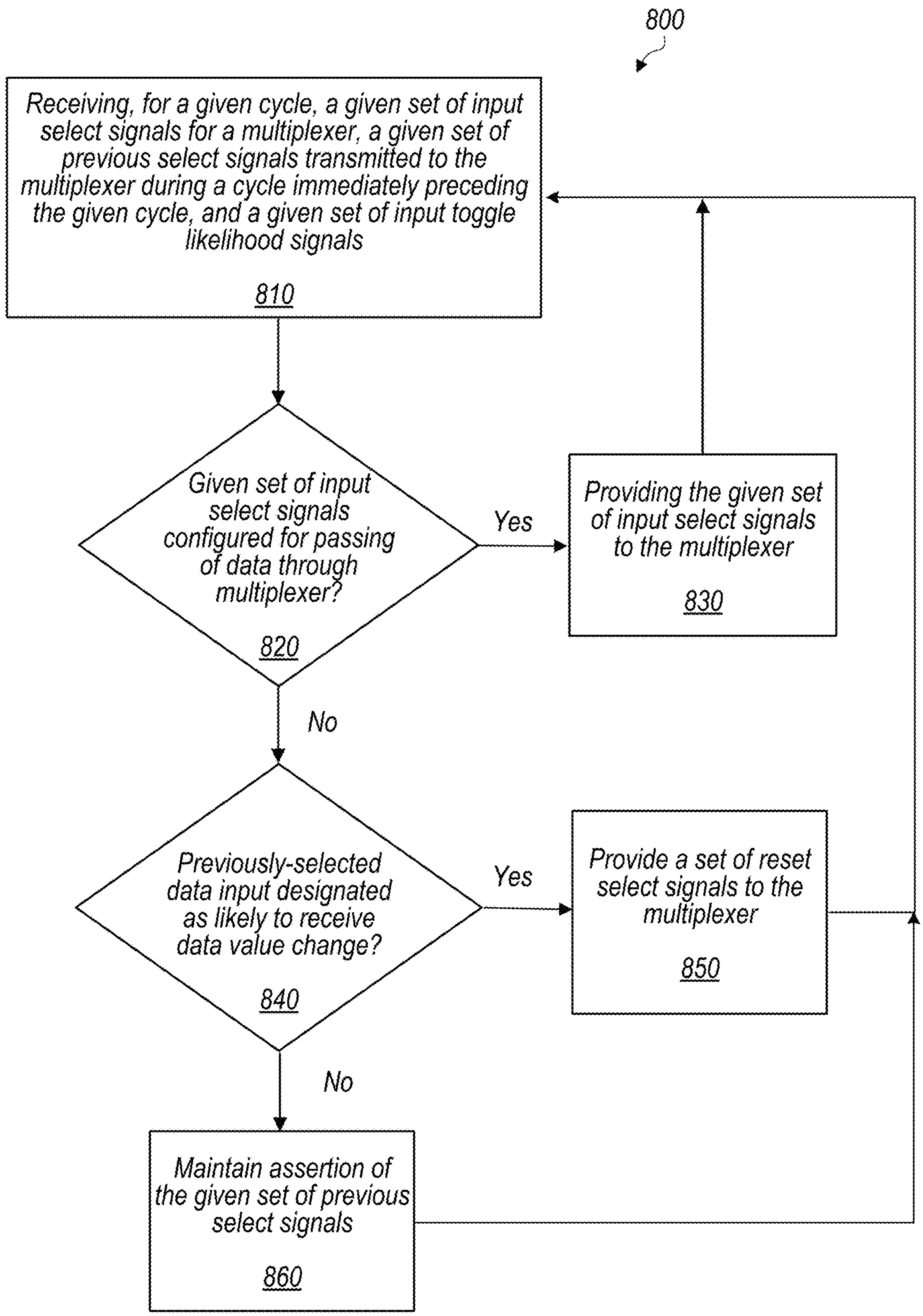
FIG. 8 is a flow diagram illustrating an example method relating to control of a multiplexer, according to some embodiments.

FIG. 8 illustrates another example method relating to control of a multiplexer including various scenarios. Method 800 of FIG. 8 illustrates one embodiment of a method performed by a control circuit for a multiplexer, such as multiplexer control circuits 100 of FIG. 1, 302 of FIG. 3 and 400 of FIG. 4. Other embodiments of a method may include more or fewer blocks than shown in FIG. 8. Method 800 includes, at block 810, receiving, for a given cycle, a given set of input select signals for a multiplexer, a given set of previous select signals transmitted to the multiplexer during a cycle immediately preceding the given cycle, and a given set of input toggle likelihood signals. If the given set of input select signals is configured for passing of data through the multiplexer ("yes" branch of decision block 820), method 800 includes, at block 830, providing the given set of input select signals to the multiplexer. If the given set of input select signals is not configured for passing of data through the multiplexer ("no" branch of decision block 820) and the previously selected data input is designated as likely to receive a data value change ("yes" branch of decision block 840), the method includes, at block 850, providing a set of reset select signals to the multiplexer. If the given set of input select signals is not configured for passing of data through the multiplexer ("no" branch of decision block 820) and the previously selected data input is not designated as likely to receive a data value change ("no" branch of decision block 840), method 800 includes, at block 860, maintaining assertion of the given set of previous select signals.

Example Device

Figure 9:
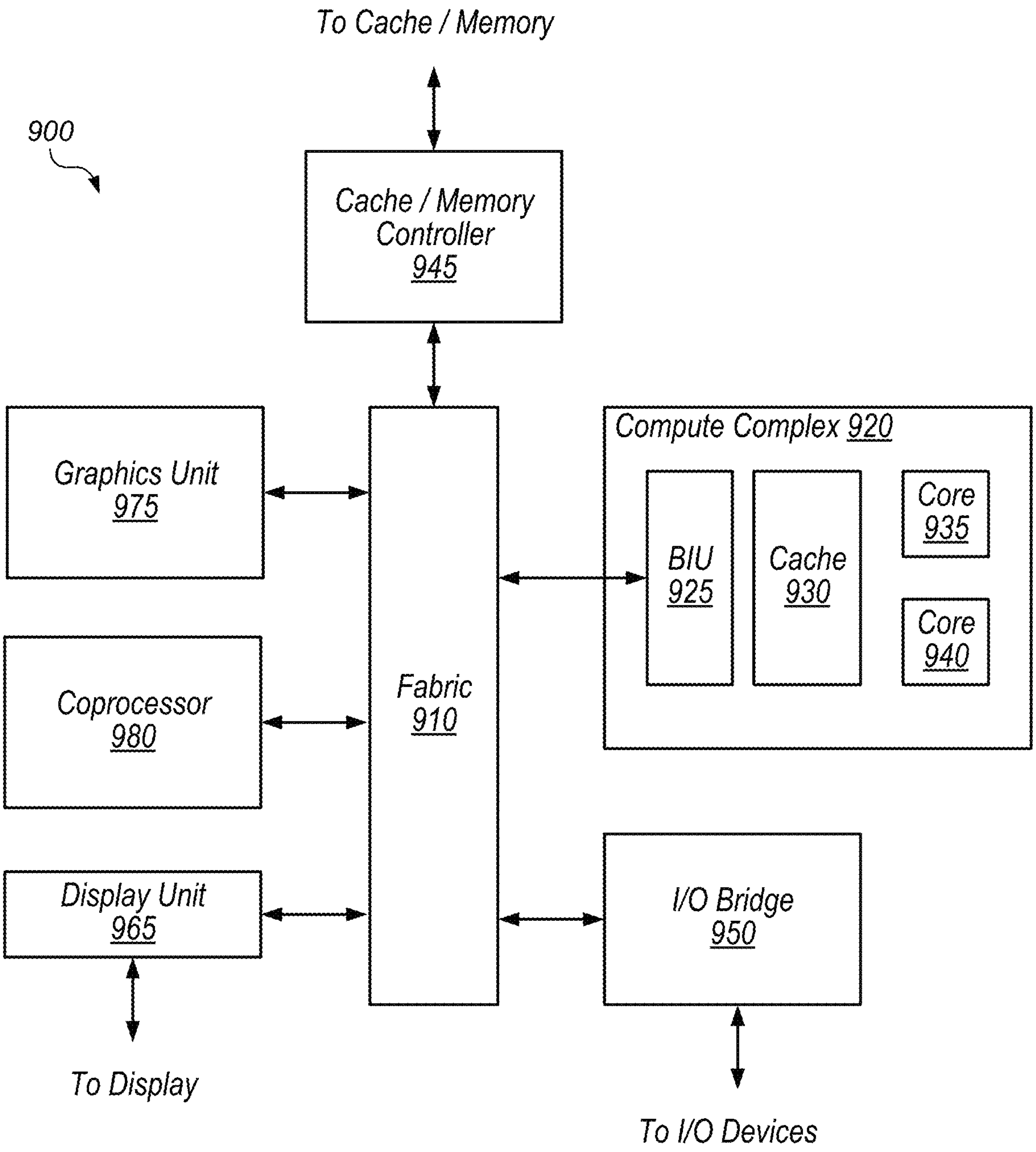
FIG. 9 is a block diagram illustrating example elements of a computing device, according to some embodiments.

Referring now to FIG. 9, a block diagram illustrating an example embodiment of a device 900 is shown. In some embodiments, elements of device 900 may be included within a system on a chip. In some embodiments, device 900 may be included in a mobile device, which may be battery-powered. Therefore, power consumption by device 900 may be an important design consideration. In the illustrated embodiment, device 900 includes fabric 910, compute complex 920 input/output (I/O) bridge 950, cache/memory controller 945, graphics unit 975, coprocessor 980 and display unit 965. In some embodiments, device 900 may include other components (not shown) in addition to or in place of the illustrated components, such as video processor encoders and decoders, image processing or recognition elements, computer vision elements, etc.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions. These instructions may be stored in computer readable medium such as a memory coupled to memory controller 945 discussed below.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches. Memory coupled to controller 945 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 945 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 920 to cause the computing device to perform functionality described herein.

Graphics unit 975 may include one or more processors, e.g., one or more graphics processing units (GPUs). Graphics unit 975 may receive graphics-oriented instructions, such as OPENGL®, Metal®, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

One or more coprocessors 980 may be used to implement particular operations. In some embodiments coprocessor 980 may implement particular operations more efficiently than a general-purpose processor. In various embodiments, coprocessors 980 include optimizations and/or specialized hardware not typically implemented by core processors in compute complex 920. In an embodiment, coprocessor 980 implements vector and matrix operations.

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 900 with connectivity to various types of other devices and networks.

Example Applications

Figure 10:
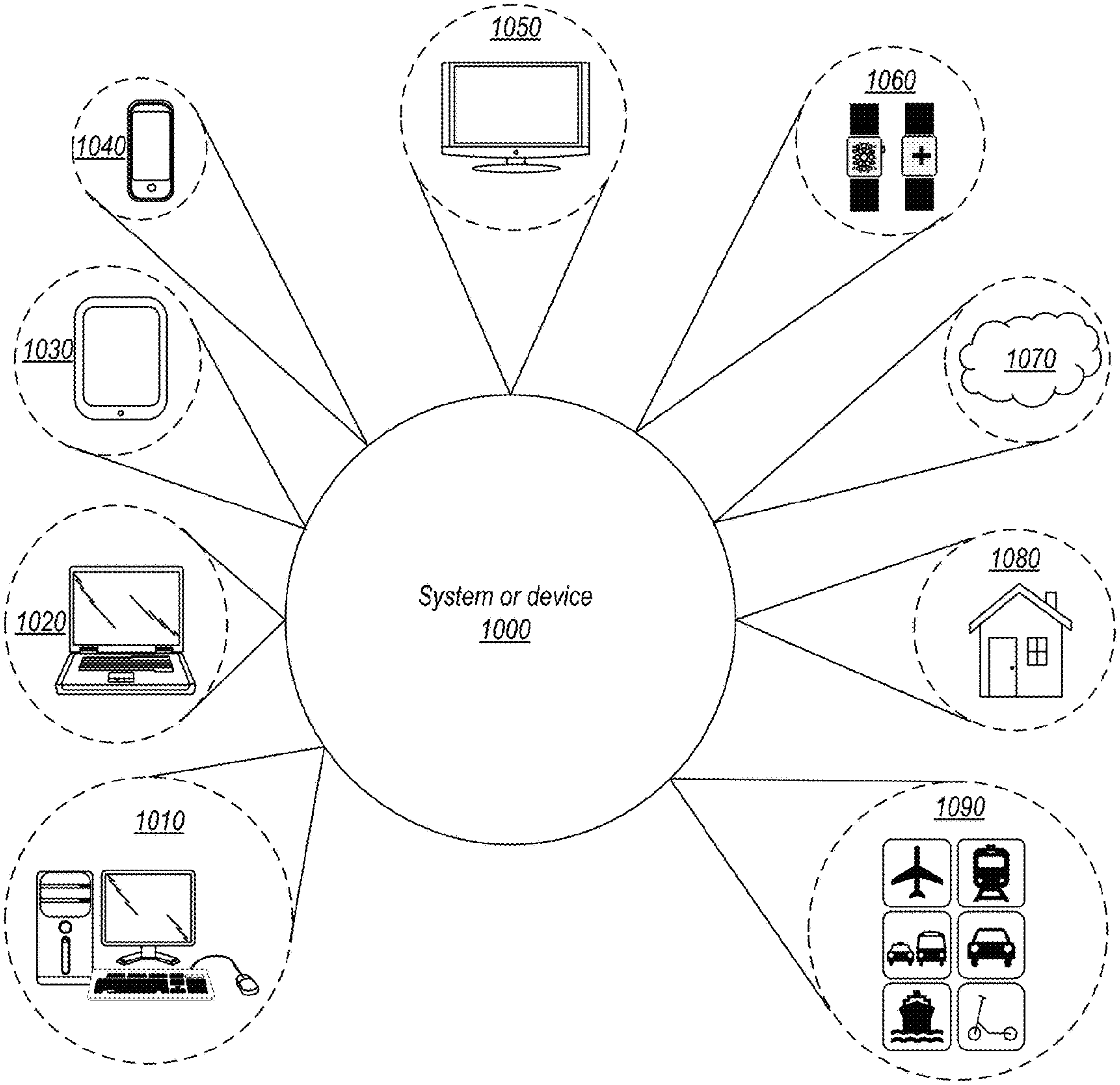
FIG. 10 is a block diagram illustrating an example computing device that is usable in various types of systems, according to some embodiments.

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 11:
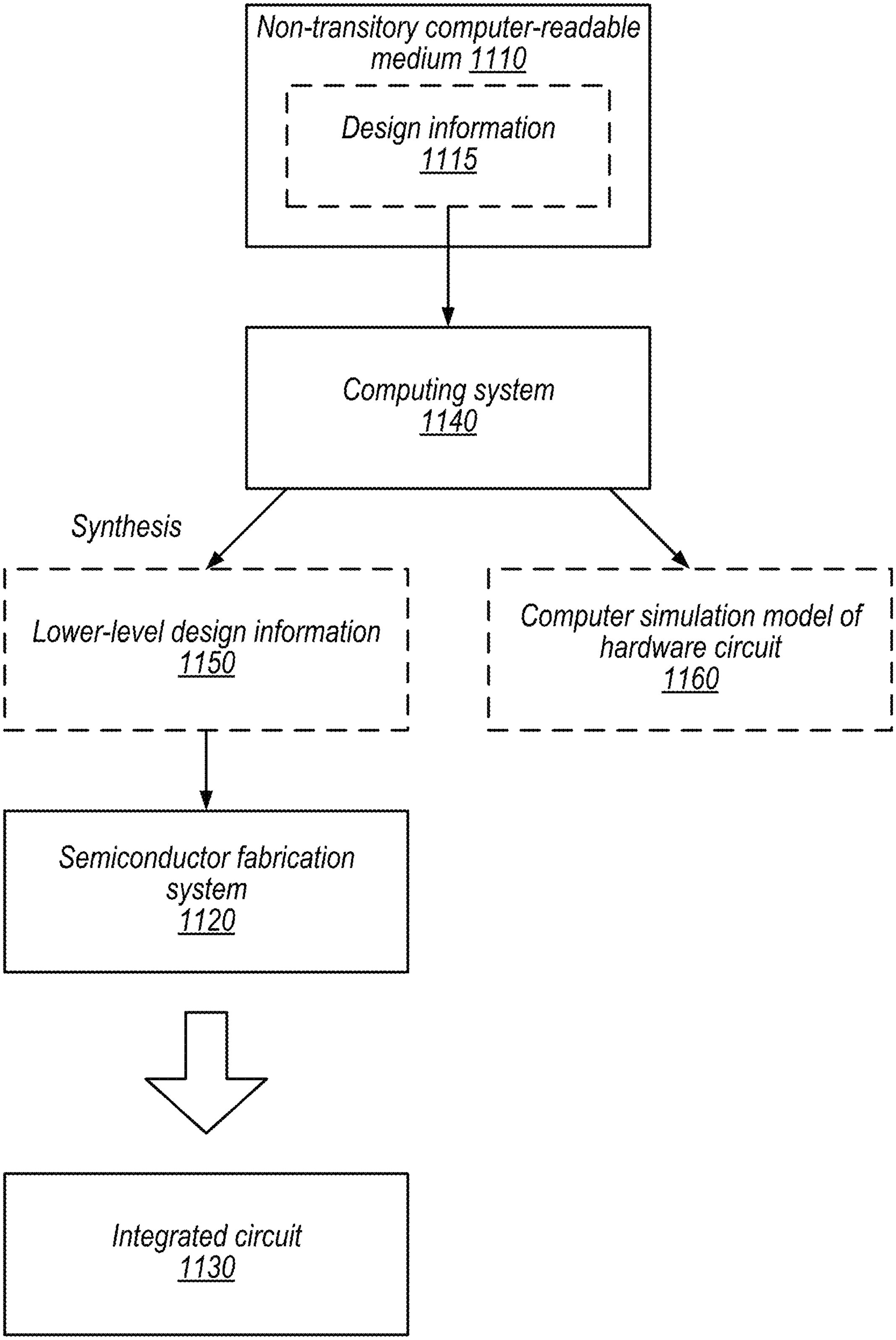
FIG. 11 is a block diagram illustrating a computer-readable storage medium storing circuit design information for a computing device, according to some embodiments.

FIG. 11 is a block diagram illustrating an example non-transitory computer-readable storage medium that stores circuit design information, according to some embodiments. In the illustrated embodiment, computing system 1140 is configured to process the design information. This may include executing instructions included in the design information, interpreting instructions included in the design information, compiling, transforming, or otherwise updating the design information, etc. Therefore, the design information controls computing system 1140 (e.g., by programming computing system 1140) to perform various operations discussed below, in some embodiments.

In the illustrated example, computing system 1140 processes the design information to generate both a computer simulation model of a hardware circuit 1160 and lower-level design information 1150. In other embodiments, computing system 1140 may generate only one of these outputs, may generate other outputs based on the design information, or both. Regarding the computing simulation, computing system 1140 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1140 also processes the design information to generate lower-level design information 1150 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1150 (potentially among other inputs), semiconductor fabrication system 1120 is configured to fabricate an integrated circuit 1130 (which may correspond to functionality of the simulation model 1160). Note that computing system 1140 may generate different simulation models based on design information at various levels of description, including information 1150, 1115, and so on. The data representing design information 1150 and model 1160 may be stored on medium 1110 or on one or more other media.

In some embodiments, the lower-level design information 1150 controls (e.g., programs) the semiconductor fabrication system 1120 to fabricate the integrated circuit 1130. Thus, when processed by the fabrication system, the design information may program the fabrication system to fabricate a circuit that includes various circuitry disclosed herein.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof.

Accordingly, non-transitory computer-readable storage medium 1110 may include two or more memory media; such media may reside in different locations—for example, in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 1140, semiconductor fabrication system 1120, or both. In some embodiments, design information may also include one or more cell libraries that specify the synthesis, layout, or both of integrated circuit 1130. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1130 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 and model 1160 are configured to operate according to a circuit design specified by design information 1115, which may include performing any of the functionality described herein. For example, integrated circuit 1130 may include any of various elements shown in FIGS. 1-5B. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1120 to fabricate integrated circuit 1130.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail.

Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a first storage circuit configured to store a first set of previous select values transmitted as a first set of previous select signals to a first multiplexer within a datapath of a computing device, wherein the first multiplexer is configured to use the first set of previous select signals to select, for generating an output of the first multiplexer, a data input from among a first set of data inputs to the first multiplexer; and
a first control circuit configured to:
receive the first set of previous select signals and a first set of input toggle likelihood signals, wherein a first input toggle likelihood signal within the first set of input toggle likelihood signals corresponds to a first data input within the first set of data inputs to the first multiplexer and a second input toggle likelihood signal within the first set of input toggle likelihood signals corresponds to a second data input within the first set of data inputs to the first multiplexer; and
based at least in part on the first set of previous select signals and the first set of input toggle likelihood signals, determine, during operation of the datapath, whether to maintain the first set of previous select signals or provide a first set of updated select signals to the first multiplexer.

2. The apparatus of claim 1, wherein:
the first data input is a previously-selected data input of the first multiplexer;
the previously-selected data input is a data input selected by application of the first set of previous select signals; and
to determine whether to maintain the previous select signals or provide a first set of updated select signals, the first control circuit is further configured to determine whether a value of the first input toggle likelihood signal indicates a designation of the previously-selected data input as likely to receive a data value change.

3. The apparatus of claim 2, wherein the first control circuit is further configured to, during a cycle for which the first multiplexer is not used to transmit valid data:
in response to determining that the value of the first input toggle likelihood signal does not indicate a designation of the previously-selected data input as likely to receive a data value change, provide a signal to the first storage circuit causing the first set of previous select signals to be maintained; and
in response to determining that the value of the first input toggle likelihood signal indicates a designation of the previously-selected data input as likely to receive a data value change, provide a signal to the first storage circuit causing the first set of updated select signals to be provided to the first multiplexer.

4. The apparatus of claim 1, wherein the first control circuit is further configured to:
receive a first set of input select signals corresponding to the first multiplexer; and
determine whether the first set of input select signals is configured for passing of data through the first multiplexer.

5. The apparatus of claim 4, wherein the first control circuit is further configured to:
using the first set of input select signals, the first set of previous select signals, and the first set of input toggle likelihood signals, generate a first output toggle likelihood signal;
provide the first output toggle likelihood signal to the first storage circuit; and
forward the first output toggle likelihood signal to an additional control circuit configured to receive an additional set of previous select signals transmitted to an additional multiplexer within the datapath, wherein the first output toggle likelihood signal is among an additional set of input toggle likelihood signals received by the additional control circuit.

6. The apparatus of claim 1, further comprising:
a second storage circuit configured to store a second set of previous select values transmitted as a second set of previous select signals for a second multiplexer within the datapath, wherein the output of the first multiplexer is connected as one of a second set of data inputs of the second multiplexer; and
a second control circuit configured to:
receive the second set of previous select signals and a second set of input toggle likelihood signals, wherein the second set of input toggle likelihood signals includes an output toggle likelihood signal generated by the first control circuit; and
based at least in part on the second set of previous select signals and the second set of input toggle likelihood signals, determine whether to maintain the second set of previous select signals or provide a second set of updated select signals to the second multiplexer.

7. A method, comprising:
receiving, by a control circuit for a multiplexer and for a first cycle, a first set of input select signals for the multiplexer, a first set of previous select signals transmitted to the multiplexer during a cycle immediately preceding the first cycle, and a first set of input toggle likelihood signals, wherein the first set of input select signals is not configured to pass data through the multiplexer, wherein:
the multiplexer is configured to use the first set of input select signals to select, for generating an output of the multiplexer, a data input from among a set of data inputs to the multiplexer;
a first input toggle likelihood signal within the first set of input toggle likelihood signals corresponds to a first data input within the set of data inputs; and
a second input toggle likelihood signal within the first set of input toggle likelihood signals corresponds to a second data input within the set of data inputs; and
determining, by the control circuit during operation of a datapath that includes the multiplexer and based on the first set of previous select signals and the first set of input toggle likelihood signals, whether to maintain assertion of the first set of previous select signals or provide a first set of updated select signals to the multiplexer.

8. The method of claim 7, wherein:
the first data input is a previously-selected data input of the multiplexer;
the previously-selected data input is an input selected by application of the first set of previous select signals to the multiplexer; and determining whether to maintain assertion of the first set of previous select signals or provide a set of updated select signals includes determining whether a value of the first input toggle likelihood signal indicates a designation of the previously-selected data input as likely to receive a data value change.

9. The method of claim 8, wherein the value of the first input toggle likelihood signal does not indicate a designation of the previously-selected data input as likely to receive a data value change, and further comprising maintaining assertion, by the control circuit, of the first set of previous select signals to the multiplexer.

10. The method of claim 8, wherein the value of the first input toggle likelihood signal indicates a designation of the previously-selected data input as likely to receive a data value change, and further comprising providing, by the control circuit and as the first set of updated select signals, a set of reset select signals configured to prevent transmission through the multiplexer of the data value change.

11. The method of claim 9, further comprising:

receiving, by the control circuit and for a second cycle, a second set of input select signals for the multiplexer, wherein the second set of input select signals is configured to pass data through the multiplexer; and providing, by the control circuit, the second set of input select signals to the multiplexer.

12. The method of claim 7, wherein determining whether to maintain assertion of the first set of previous select signals or provide a first set of updated select signals includes generating, using the first set of previous select signals and the first set of input toggle likelihood signals, a first output toggle likelihood signal.

13. The method of claim 12, further comprising forwarding the first output toggle likelihood signal to an additional control circuit for an additional multiplexer, wherein the first output toggle likelihood signal forms one of an additional set of input toggle likelihood signals received by the additional control circuit.

14. A non-transitory computer readable medium having stored thereon design information that specifies, in a format recognized by a fabrication system that is configured to use the design information to produce a hardware integrated circuit, at least a portion of a design of a first multiplexer control circuit, the first multiplexer control circuit comprising:

a first storage circuit configured to store a first set of previous select values transmitted as a first set of previous select signals to a first multiplexer within a datapath of a computing device, wherein the first multiplexer is configured to use the first set of previous select signals to select, for generating an output of the first multiplexer, a data input from among a first set of data inputs to the first multiplexer; and a first control circuit configured to:

receive the first set of previous select signals and a first set of input toggle likelihood signals, wherein a first input toggle likelihood signal within the first set of input toggle likelihood signals corresponds to a first data input within the first set of data inputs to the first multiplexer and a second input toggle likelihood signal within the first set of input toggle likelihood signals corresponds to a second data input within the first set of data inputs to the first multiplexer; and based at least in part on the first set of previous select signals and the first set of input toggle likelihood signals, determine, during operation of the datapath, whether to maintain the first set of previous select signals or provide a first set of updated select signals to the first multiplexer.

15. The computer readable medium of claim 14, wherein the design information further specifies at least a portion of a design of the datapath including the first multiplexer.

16. The computer readable medium of claim 14, wherein the design information further specifies at least a portion of a design of the computing device.

17. The computer readable medium of claim 16, wherein the computing device is a graphics processing device.

18. The computer readable medium of claim 14, wherein:

the first data input is a previously-selected data input of the first multiplexer;

the previously-selected data input is a data input selected by application of the first set of previous select signals; and to determine whether to maintain the previous select signals or provide a first set of updated select signals, the first control circuit is further configured to determine whether a value of the first input toggle likelihood signal indicates a designation of the previously-selected data input as likely to receive a data value change.

19. The computer readable medium of claim 18, wherein the first control circuit is further configured to, during a cycle for which the first multiplexer is not used to transmit valid data:

in response to determining that the value of the first input toggle likelihood signal does not indicate a designation of the previously-selected data input as likely to receive a data value change, provide a signal to the first storage circuit causing the first set of previous select signals to be maintained; and in response to determining that the value of the first input toggle likelihood signal indicates a designation of the previously-selected data input as likely to receive a data value change, provide a signal to the first storage circuit causing the first set of updated select signals to be provided to the first multiplexer.

20. The apparatus of claim 1, wherein:

the first control circuit is configured to first determine that the output of the first multiplexer is not observable at an output of the datapath;

the first control circuit is configured to perform the determination whether to maintain the first set of previous select signals or provide the first set of updated select signals in response to the first determination; and the first set of updated select signals correspond to a reset value for the first multiplexer.

* * * * *